United States Patent
Mariyama et al.

(10) Patent No.: US 11,173,613 B2
(45) Date of Patent: Nov. 16, 2021

(54) POSITION CONTROL DEVICE AND POSITION CONTROL METHOD

(71) Applicant: MITSUBISHI ELECTRIC CORPORATION, Tokyo (JP)

(72) Inventors: Toshisada Mariyama, Tokyo (JP); Mamoru Miura, Tokyo (JP); Wataru Matsumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 320 days.

(21) Appl. No.: 16/483,350

(22) PCT Filed: Feb. 9, 2017

(86) PCT No.: PCT/JP2017/004733
§ 371 (c)(1),
(2) Date: Aug. 2, 2019

(87) PCT Pub. No.: WO2018/146770
PCT Pub. Date: Aug. 16, 2018

(65) Prior Publication Data
US 2019/0375112 A1    Dec. 12, 2019

(51) Int. Cl.
*B25J 13/00* (2006.01)
*B25J 9/16* (2006.01)
(Continued)

(52) U.S. Cl.
CPC ............. *B25J 13/085* (2013.01); *B25J 9/126* (2013.01); *B25J 9/163* (2013.01); *B25J 9/1697* (2013.01); *G06N 3/08* (2013.01)

(58) Field of Classification Search
CPC . B25J 13/085; B25J 9/126; B25J 9/163; B25J 9/1697; B25J 19/023; B25J 9/161;
(Continued)

(56) References Cited

U.S. PATENT DOCUMENTS

| 1,016,981 A | * | 2/1912 | Carmichael | ............. F02B 53/00 |
| | | | | 123/18 R |
| 6,141,863 A | | 11/2000 | Hara et al. | |

(Continued)

FOREIGN PATENT DOCUMENTS

| EP | 1016981 A1 * | 7/2000 | ........... G05B 13/048 |
| JP | H05-318355 A | 12/1993 | |

(Continued)

OTHER PUBLICATIONS

Richard S. Sutton and Andrew G. Barto, Reinforcement Learning: An Introduction, 2017, A Bradford Book, The MIT Press, Cambridge, Massachusetts, London, England, pp. 1-445 (Year: 2017).*

(Continued)

*Primary Examiner* — Jaime Figueroa
(74) *Attorney, Agent, or Firm* — Birch, Stewart, Kolasch & Birch, LLP.

(57) ABSTRACT

In a case of performing operations including alignment and insertion regarding two objects, a path setting unit 806 and an actor unit 804 are provided to learn a control amount. The path setting unit 806 provides the amount of movement for removing an object from its inserted position, and for locating it on and around the path of removing. The actor unit 804 obtains positions of the object and the values of a force sensor 801 there to perform learning by letting the positions of the object be the values for the output layer and letting the values of the force sensor 801 be the values for the input layer. Therefore, learning data can be collected efficiently.

18 Claims, 13 Drawing Sheets

(51) Int. Cl.
 *G06N 3/08* (2006.01)
 *B25J 13/08* (2006.01)
 *B25J 9/12* (2006.01)

(58) Field of Classification Search
 CPC ......... B25J 9/1664; B25J 9/1694; G06N 3/08; G06N 3/0445; G06N 3/0454; G05D 3/00
 USPC .................................................. 700/245–264
 See application file for complete search history.

(56) References Cited

U.S. PATENT DOCUMENTS

| | | | | |
|---|---|---|---|---|
| 7,657,345 | B2* | 2/2010 | Endo | B62D 57/032 700/249 |
| 8,001,063 | B2* | 8/2011 | Tesauro | G06Q 10/06 706/12 |
| 8,155,763 | B2* | 4/2012 | Sekiai | G05B 13/042 700/31 |
| 8,175,982 | B2* | 5/2012 | Hamagami | G06N 20/00 706/12 |
| 9,008,840 | B1* | 4/2015 | Ponulak | G06N 3/049 700/250 |
| 9,032,603 | B2* | 5/2015 | Yamamoto | B25J 9/1687 29/407.1 |
| 9,156,165 | B2* | 10/2015 | Ponulak | G05B 13/0265 |
| 9,358,685 | B2* | 6/2016 | Meier | G05B 13/027 |
| 9,508,148 | B2* | 11/2016 | Zhang | B25J 9/1692 |
| 9,579,789 | B2* | 2/2017 | Passot | B25J 9/163 |
| 9,849,592 | B2* | 12/2017 | Takahashi | B25J 9/1694 |
| 10,343,282 | B2* | 7/2019 | Nakada | B25J 9/1687 |
| 10,776,692 | B2* | 9/2020 | Lillicrap | G06N 3/084 |
| 2005/0113973 | A1* | 5/2005 | Endo | B25J 13/08 700/245 |
| 2006/0155664 | A1 | 7/2006 | Morikawa et al. | |
| 2009/0012632 | A1* | 1/2009 | Sekiai | G05B 13/042 700/29 |
| 2009/0012922 | A1* | 1/2009 | Tesauro | G06Q 10/06 706/12 |
| 2009/0234783 | A1* | 9/2009 | Hamagami | G06N 20/00 706/12 |
| 2013/0073080 | A1* | 3/2013 | Ponulak | B25J 9/1635 700/246 |
| 2014/0025613 | A1* | 1/2014 | Ponulak | G06N 3/08 706/25 |
| 2015/0094850 | A1* | 4/2015 | Passot | B25J 9/163 700/245 |
| 2015/0217449 | A1* | 8/2015 | Meier | G05B 13/027 700/257 |
| 2016/0361125 | A1* | 12/2016 | Balicki | B25J 19/06 |
| 2017/0024643 | A1* | 1/2017 | Lillicrap | G06N 3/006 |
| 2018/0233856 | A1* | 8/2018 | Brandwijk | A63H 33/042 |
| 2019/0294930 | A1* | 9/2019 | Koike | G02B 21/36 |
| 2019/0332952 | A1* | 10/2019 | Nonaka | G06K 9/00335 |
| 2020/0023520 | A1* | 1/2020 | Yoshizumi | B25J 9/1687 |
| 2020/0086483 | A1* | 3/2020 | Li | B25J 9/163 |
| 2020/0164514 | A1* | 5/2020 | Kaneko | B25J 9/1666 |
| 2021/0197369 | A1* | 7/2021 | Hasunuma | B25J 19/023 |

FOREIGN PATENT DOCUMENTS

| | | |
|---|---|---|
| JP | 2005-125475 A | 5/2005 |
| JP | 2008-305064 A | 12/2008 |
| JP | 2011-110688 A | 6/2011 |
| JP | 2015-168017 A | 9/2015 |
| JP | 2015-217486 A | 12/2015 |
| WO | WO 98/17444 A1 | 4/1998 |
| WO | WO 2004/068399 A1 | 8/2004 |

OTHER PUBLICATIONS

International Search Report for PCT/JP2017/004733 (PCT/ISA/210) dated Apr. 4, 2017, with English translation.

Notification of Reasons for Refusal dated Aug. 8, 2017 of Japanese Patent Application No. 2017-535467, which corresponds to International Application No. PCT/JP2017/004733, and its English translation.

Notification of Reasons for Refusal dated Nov. 14, 2017 of Japanese Patent Application No. 2017-535467, which corresponds to International Application No. PCT/JP2017/004733, and its English translation.

Sutton et al., "Reinforcement Learning", translated by Sadayoshi Mikami and Masaaki Minagawa, Morikita Publishing Co., Ltd., Dec. 2000, pp. 142-172.

Office Action dated Feb. 26, 2021 in corresponding Indian Patent Application No. 201947029696.

* cited by examiner

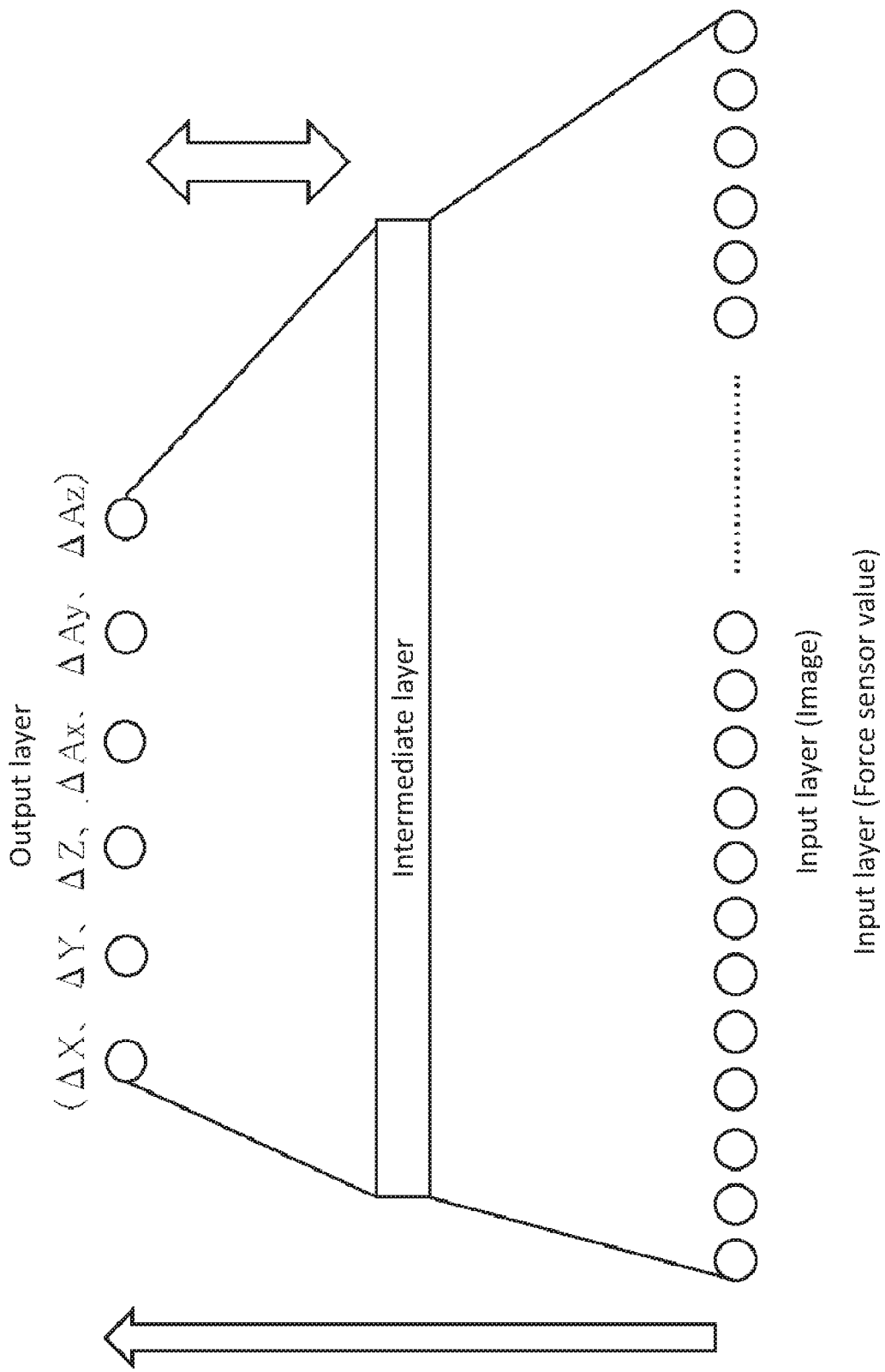

POSITION CONTROL DEVICE AND POSITION CONTROL METHOD

TECHNICAL FIELD

The present invention relates to a position control device and a position control method.

BACKGROUND ART

In general, to create a production system in which a robot arm performs assembly work requires manual instruction operation, called teaching, to be performed by an operator. In such a case, the robot repeats motions only for the position stored in the teaching, so that the robot may not be able to respond properly if manufacturing or mounting errors occur. Therefore, if a position correction technique that can allow individual positional errors is developed, increase of opportunity to use robots as well as improvement of productivity is expected.

A conventional technique enables position correction using a camera image in operations up to the connector insertion (Patent Document 1). Also, if a plurality of devices such as a force sensor and a stereo camera are used, it is possible to allow position errors affecting the production assembly (insertion, work holding, etc.). For determining the position correction amount, however, the values such as the coordinates of the center of the gripped connector and the coordinates of the center of the connector being the insertion destination part have to be specifically calculated from the image information, as the Patent Document 1 discloses. Because this calculation depends on the shapes of the connectors, setting must be made for each connector to be used, by a designer. If the three-dimensional information is obtained from a device such as a range camera, the calculation is comparatively easy. However, if the three-dimensional information has to be obtained from two dimensional image information, the image processing algorithms have to be developed for each connector, requiring a lot of design cost.

As a method for a robot to automatically learn to acquire proper actions, there are such methods called deep learning and deep reinforcement learning. However, data collection using techniques such as reinforcement learning need to experience the same situation many times, so that a large number of trials are required and satisfactory performance cannot be guaranteed for unexperienced situations. In addition, the learning data has to be collected evenly and extensively for a large variety of situations, which takes a lot of time and effort.

A method disclosed in Patent Document 2, for example, enables determination of an optimal path in a single successful attempt; however, it is impossible to collect data that can be used for deep learning or deep reinforcement learning.

REFERENCES CITED

Patent Documents

Patent Document 1: WO 98-017444

Patent Document 2: Japanese Patent Laid-Open Publication No. 2005-125475

SUMMARY OF INVENTION

Technical Problem

In a case of performing operations including alignment and insertion regarding two objects, it was necessary to do insertion regarding the two objects many times to acquire a large amount of data.

The present disclosure, devised to solve the problem, enables collection of the learning data efficiently only through a single insertion.

Solution to Problem

A position control device according to the present invention, in a case of performing operations including alignment and insertion regarding two objects, includes: a path setting unit to instruct, in removing one of the two objects from their inserted state, a first amount of movement for moving from the inserted state to a position on a path where the inserted state is not released, and a second amount of movement for randomly moving from the first amount of movement to a peripheral position where the inserted state is not released; and an actor unit to obtain position data and a force sensor value after movement to learn the position data after movement as an output layer and the force sensor value at the position after movement as an input layer, and to obtain a reward value that decreases in proportion to the force sensor value.

Advantageous Effects of Invention

According to the present disclosure, in a case of performing operations including alignment and insertion regarding two objects, the values of a force sensor is measured on and around a path through which an object is removed from its inserted position; this enables efficient collection of learning data.

BRIEF DESCRIPTION OF THE DRAWINGS

FIG. 13 is an example showing a neural network and a learning rule of the neural network according to Embodiment 3.

DESCRIPTION OF EMBODIMENTS

Embodiment 1

Hereinafter, Embodiments of the present invention will be described.

In Embodiment 1, a robot arm which learns the insertion positions of connectors and operates in a production line as well as its position control method will be described.

Figure 1:
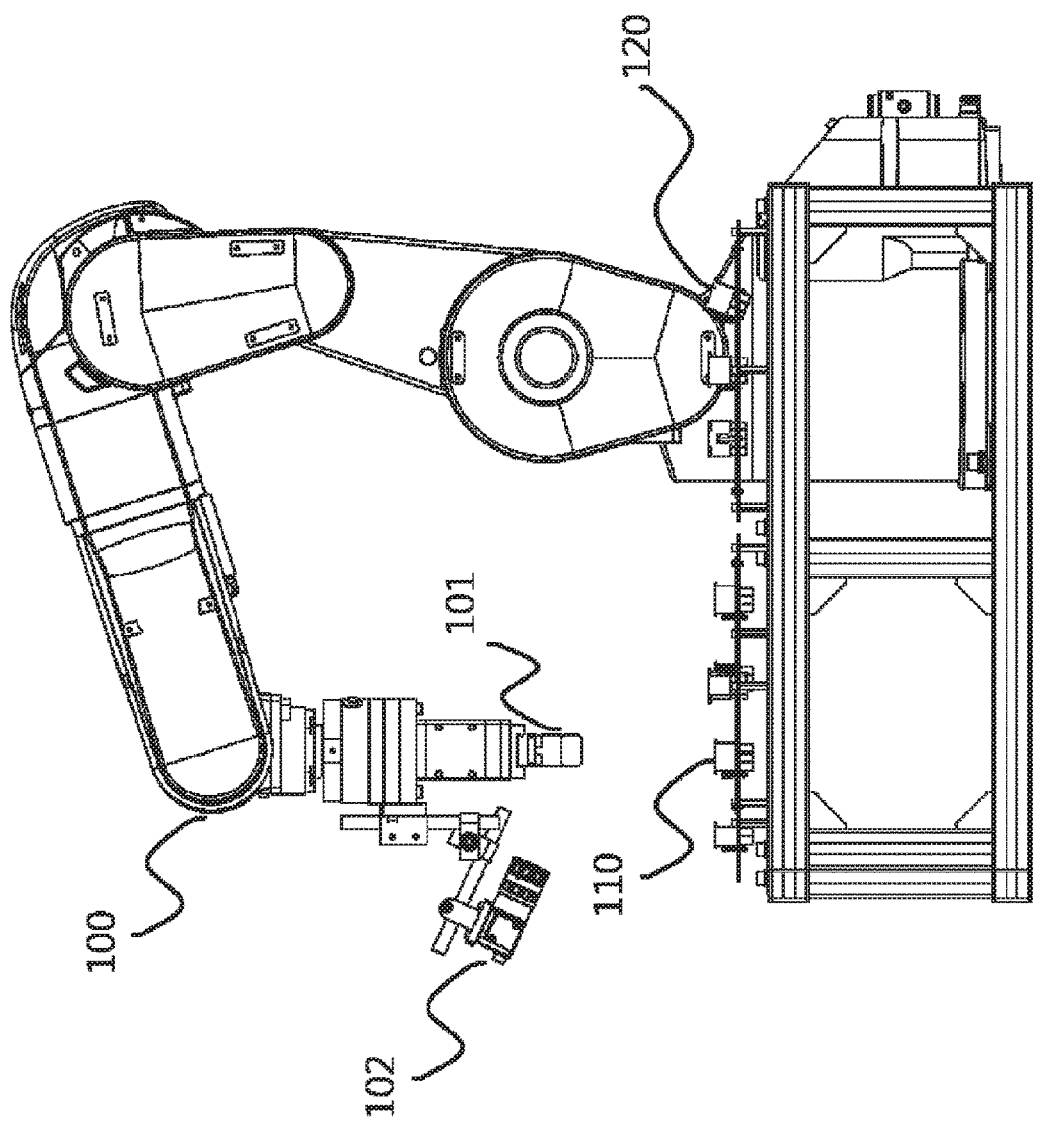
FIG. 1 is an illustration in which a robot arm 100 according to Embodiment 1, male connectors 110, and female connectors 120 are arranged.

Configurations will be described. FIG. 1 is an illustration in which a robot arm 100, male connectors 110, and female connectors 120 according to Embodiment 1 are arranged. The robot arm 100 is provided with a gripping unit 101 to grip a male connector 110, and a monocular camera 102 is attached to the robot arm 100 at a position where the monocular camera 102 can view the gripping unit. When the gripping unit 101 at the end of the robot arm 100 is gripping the male connector 110, the monocular camera 102 is positioned so as to be able to view the end of the gripped male connector 110 and the female connector 120 into which it will be inserted.

Figure 2:
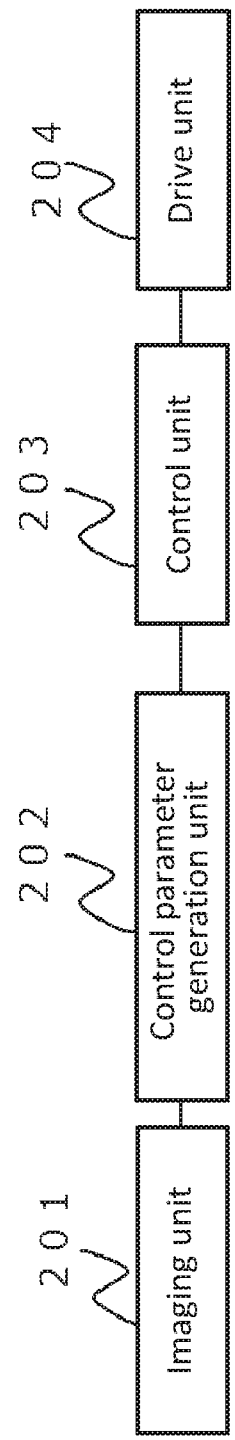
FIG. 2 is a functional configuration diagram showing the position control device according to Embodiment 1.

FIG. 2 is a functional configuration diagram showing the position control device according to Embodiment 1.

As shown in FIG. 2, the position control device includes: an imaging unit 201 to capture images, the imaging unit 201 being a function of the monocular camera 102 shown in FIG. 1; a control parameter generation unit 202 to generate a position control amount of the robot arm 100 by using the captured images; a control unit 203 to control the current and voltage values to be provided for the drive unit 204 of the robot arm 100 by using the position control amount; and a drive unit 204 to change the position of the robot arm 100 on the basis of the current and voltage values outputted from the control unit 203.

The control parameter generation unit 202 determines, upon receiving an image captured by the imaging unit 201 that is a function of the monocular camera 102, the control amount ($\Delta X$, $\Delta Y$, $\Delta Z$, $\Delta Ax$, $\Delta Ay$, $\Delta Az$) corresponding to the position of the robot arm 100 (X, Y, Z, Ax, Ay, Az), and outputs the control amount to the control unit 203. Here, X, Y, and Z being coordinates of the position of the robot arm 100, and Ax, Ay, and Az being the attitude angles of the robot arm 100.

The control unit 203 determines and controls the current and voltage values for the devices composing the drive unit 204 on the basis of the received control amount ($\Delta X$, $\Delta Y$, $\Delta Z$, $\Delta Ax$, $\Delta Ay$, $\Delta Az$) corresponding to the position (X, Y, Z, Ax, Ay, Az) of the robot arm 100.

Each device composing the drive unit 204 operates according to the current and voltage values received from the control unit 203, causing the robot arm 100 to move to the position (X+$\Delta X$, Y+$\Delta Y$, Z+$\Delta Z$, Ax+$\Delta Ax$, Ay+$\Delta Ay$, Az+$\Delta Az$).

Figure 3:
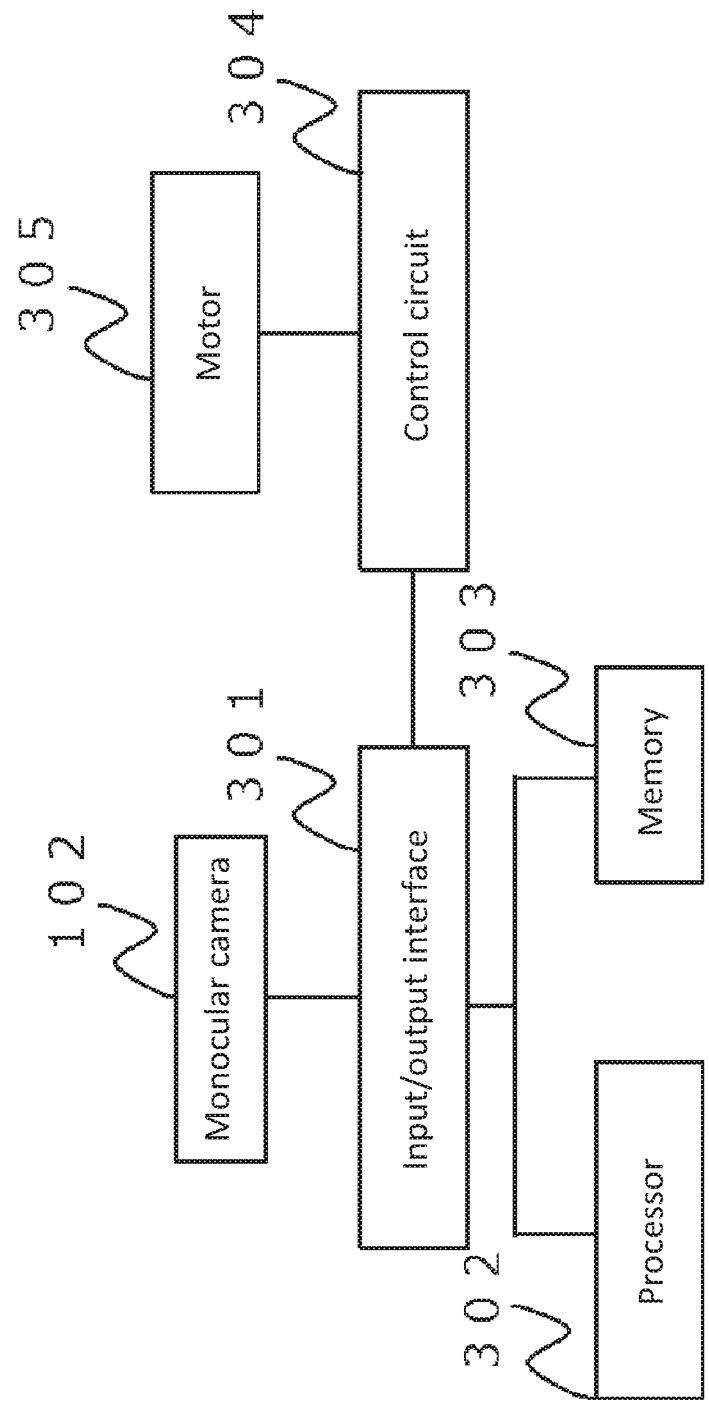
FIG. 3 is a hardware structure diagram showing the position control device according to Embodiment 1.

FIG. 3 is a hardware structure diagram of the position control device according to Embodiment 1. The monocular camera 102 is communicably connected wired or wirelessly with a processor 302 and a memory 303 via an input/output interface 301. The input/output interface 301, the processor 302, and the memory 303 realize the functions of the control parameter generation unit 202 in FIG. 2. The input/output interface 301 is communicably connected wired or wirelessly with a control circuit 304 corresponding to the control unit 203. The control circuit 304 is also electrically connected to a motor 305. The motor 305, corresponding to the drive unit 204 in FIG. 2, is a component for each device to perform position control. In the present embodiment, the motor 305 is used as a form of the hardware corresponding to the drive unit 204, any hardware capable of providing the functionality of such position control would suffice. The monocular camera 102 and the input/output interface 301 may be separate bodies, and the input/output interface 301 and the control circuit 304 may be separate bodies.

Next, operations will be described.

Figure 4:
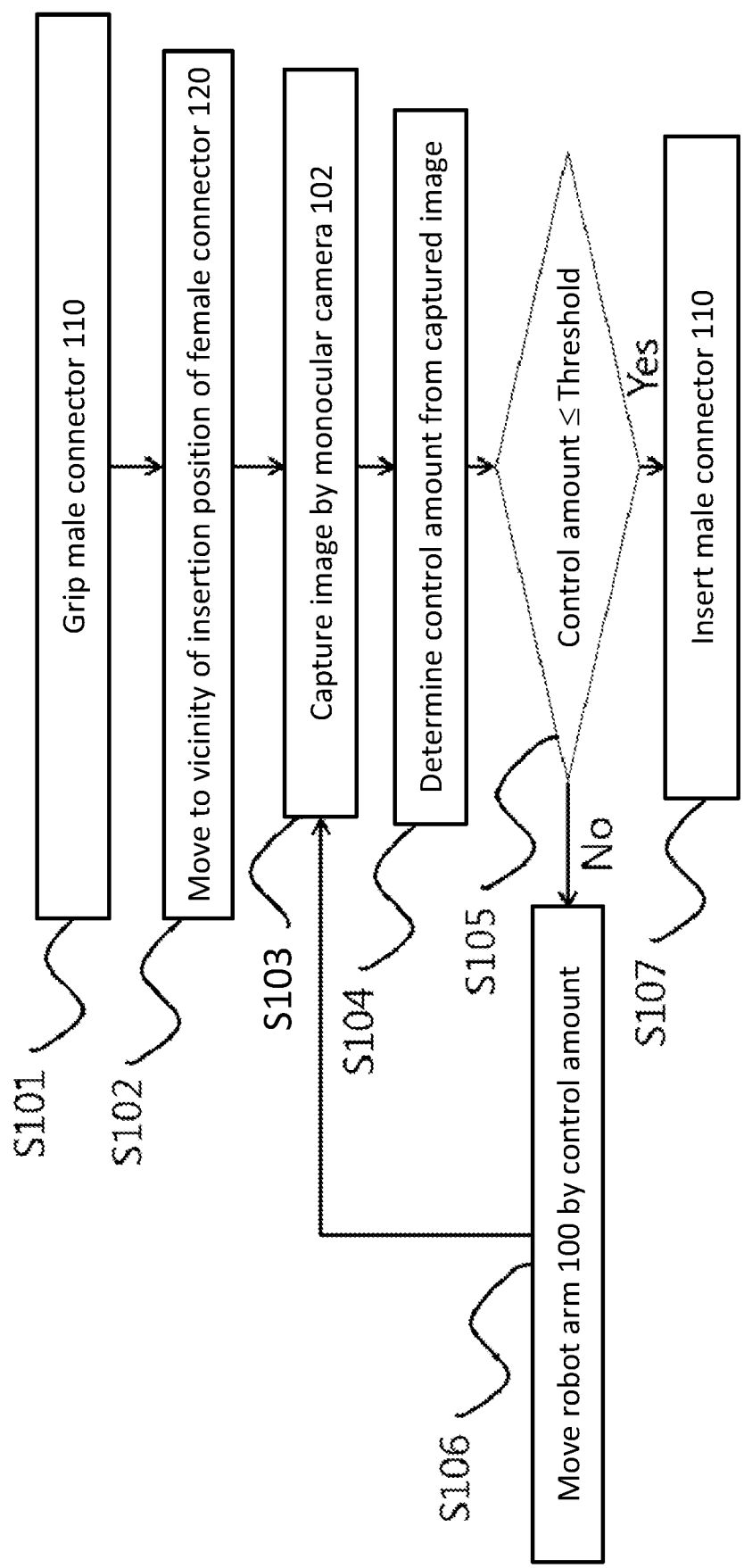
FIG. 4 is a flowchart showing the position control performed by the position control device according to Embodiment 1.

FIG. 4 is a flowchart showing the position control performed by the position control device according to Embodiment 1.

First, in Step S101, the gripping unit 101 of the robot arm 100 grips a male connector 110. The position and the attitude of the male connector 110 are preregistered in the control unit 203 shown in FIG. 2, and the operation is performed in accordance with the control program also preregistered in the control unit 203.

Next, in Step S102, the robot arm 100 is brought closer to the vicinity of the insertion position of a female connector 120. The approximate position and attitude of the female connector 120 are preregistered in the control unit 203 shown in FIG. 2, and the position of the male connector 110 is controlled in accordance with the control program preregistered in the control unit 203.

Next, in Step S103, the control parameter generation unit 202 instructs the imaging unit 201 of the monocular camera 102 to capture an image, and the monocular camera 102 captures an image which includes both the male connector 110 gripped by the gripping unit 101 and the female connector 120 being the insertion destination part.

Next, in Step S104, the control parameter generation unit 202 obtains the image from the imaging unit 201 and determines the control amount ($\Delta X$, $\Delta Y$, $\Delta Z$, $\Delta Ax$, $\Delta Ay$, $\Delta Az$). In determining the control amount, the control parameter generation unit 202 uses the processor 302 and the memory 303 shown in FIG. 3 as hardware, and calculates the control amount ($\Delta X$, $\Delta Y$, $\Delta Z$, $\Delta Ax$, $\Delta Ay$, $\Delta Az$) by using a neural network. The calculation method of the control amount by using the neural network will be described later.

Next, in Step S105, the control unit 203 obtains the control amount ($\Delta X$, $\Delta Y$, $\Delta Z$, $\Delta Ax$, $\Delta Ay$, $\Delta Az$) outputted from the control parameter generation unit 202, and compares all components of the control amount with their respective predetermined threshold values. If all components of the control amount are equal to or less than their respective threshold values, the process proceeds to Step S107, and the control unit 203 controls the drive unit 204 so that the male connector 110 is inserted into the female connector 120.

If any one of the components of the control amount is larger than its corresponding threshold value, the control unit 203 controls the drive unit 204, in Step S106, by using the control amount ($\Delta X$, $\Delta Y$, $\Delta Z$, $\Delta Ax$, $\Delta Ay$, $\Delta Az$) outputted by the control parameter generation unit 202, and the process returns to Step S103.

Next, the calculation method of the control amount by using the neural network performed in Step S104 of FIG. 4 will be described.

Before starting the calculation of the control amount by using the neural network, a plurality of data sets of an image and a required amount of movement are collected; this is a preparation for enabling the neural network to calculate the amount of movement until successful fitting using the input image. For example, the male connector 110 and the female connector 120, whose positions are known, are fitted together, and the male connector 110 is gripped by the gripping unit 101 of the robot arm 100. Then, the gripping unit 101 moves along the known direction, pulling out the connector, up to the insertion start position, and the monocular camera 102 captures a plurality of images. Also, with the control amount for the insertion start position being set to (0, 0, 0, 0, 0, 0), not only the amount of movement from the fitting state positon to the start position of insertion with its image but also the amounts of movement to positions in the vicinity of the insertion start position, or the control amounts ($\Delta X$, $\Delta Y$, $\Delta Z$, $\Delta Ax$, $\Delta Ay$, $\Delta Az$), with their images are acquired.

Figure 5:
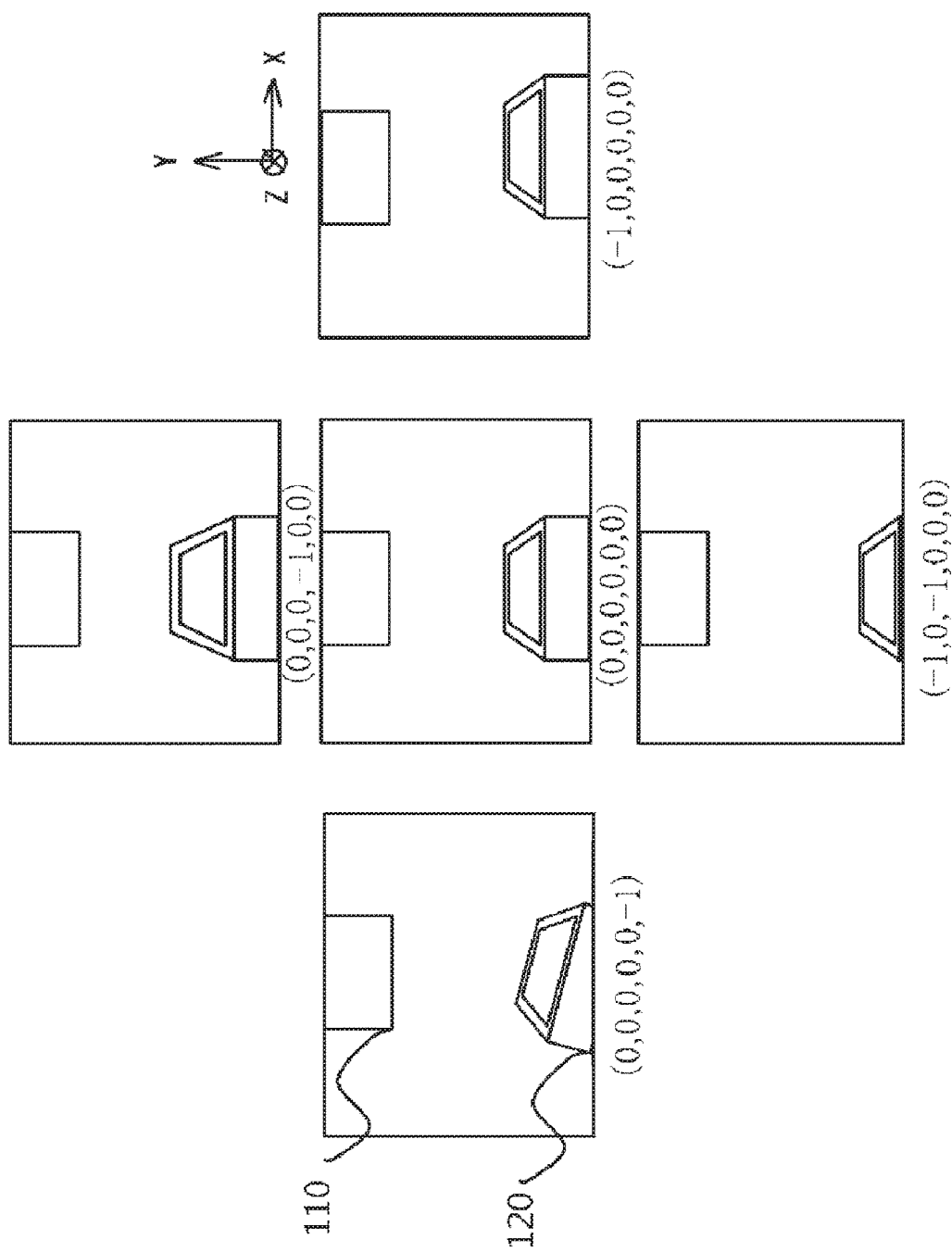
FIG. 5 is an example of diagrams showing the camera images and the control amounts; the images are captured by the monocular camera 102 according to Embodiment 1 at the insertion start position and at its vicinities.

FIG. 5 is an example of diagrams showing control amounts and their respective images captured by the monocular camera 102 in Embodiment 1 at the insertion start position and at its vicinities.

Then, the learning is performed on the basis of a general learning rule of the neural network (such as a stochastic gradient method) by using the plurality of data sets each composed of the amount of movement from the fitting position to the insertion start position and the image captured by the monocular camera 102 at the insertion start position or its vicinity.

There are various types in the neural network such as CNN and RNN, and any type can be used for the present disclosure.

Figure 6:
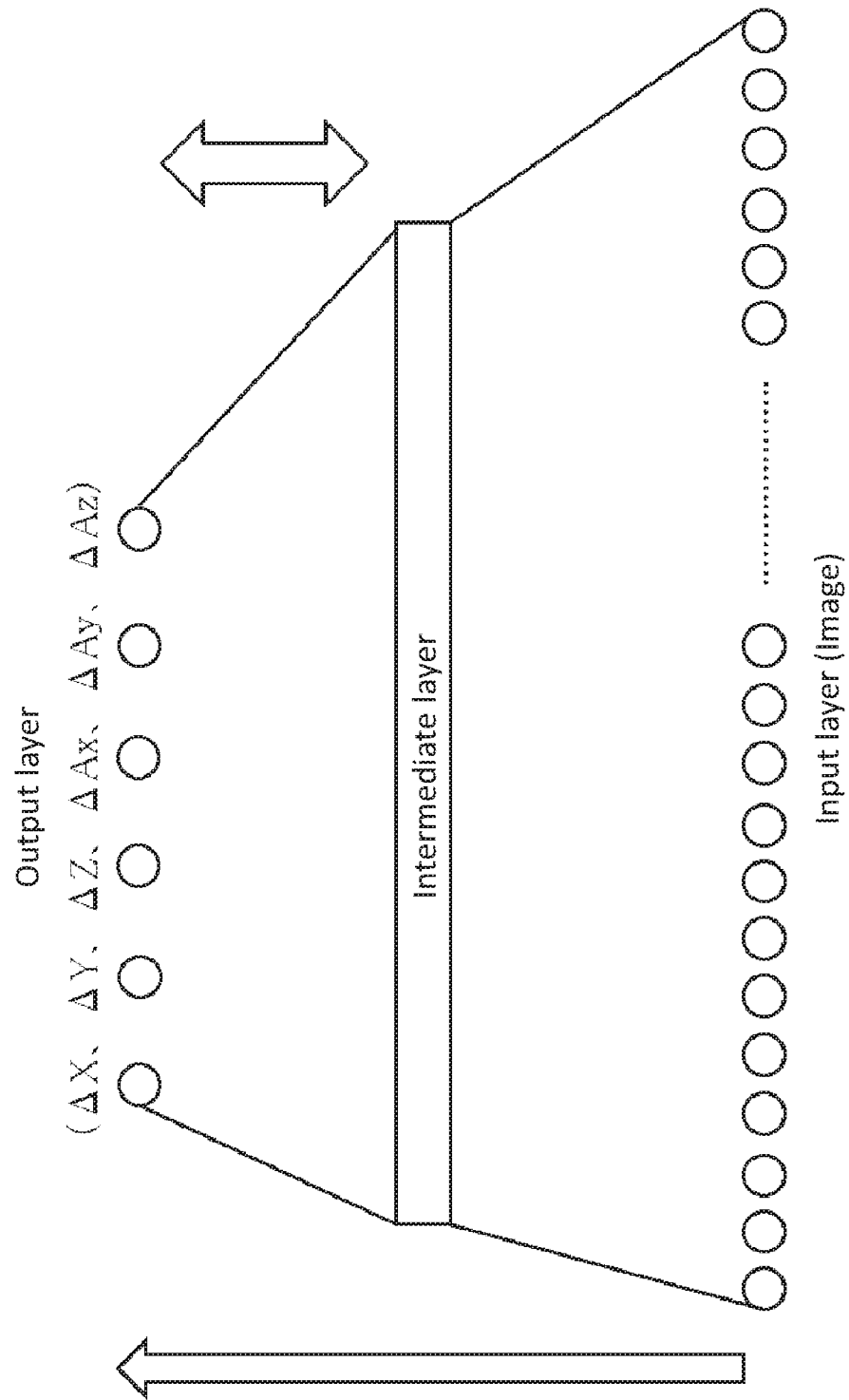
FIG. 6 is an example showing a neural network and a learning rule of the neural network according to Embodiment 1.

FIG. 6 is a diagram showing an example of the neural network and the learning rule of the neural network according to Embodiment 1.

The images obtained from the monocular camera 102 (such as luminance and color difference of each pixel) are fed to the input layer, and the control amounts ($\Delta X$, $\Delta Y$, $\Delta Z$, $\Delta Ax$, $\Delta Ay$, $\Delta Az$) are outputted in the output layer.

In the learning process of the neural network, the parameters of the intermediate layer are optimized so that the output values of the output layer obtained from the inputted images via the intermediate layer are approximated to the control amounts stored in association with their respective images. Such approximation methods include the stochastic gradient method.

Therefore, more accurate learning can be achieved, as shown in FIG. 5, by obtaining the images corresponding not only to the amount of movement from the fitting position to the insertion start position, but also to the amounts of movements to positions around the insertion start position.

In FIG. 5, a case is shown where the position of the male connector 110 is fixed with respect to the monocular camera 102 and only the position of the female connector 120 is changed. Actually, however, the gripping unit 101 of the robot arm 100 does not always grip the male connector 110 accurately at the designated position, and the position of the male connector 110, due to its individual differences, etc., may deviate from the normal position. In the learning process, in a state where the male connector 110 deviated from the accurate position, data sets of a control amount and an image at the insertion start position and the positions in its vicinities are acquired to perform learning; thus, the learning that can cope with individual differences of both the male connector 110 and the female connector 120 is performed.

Note here that, the control amount ($\Delta X$, $\Delta Y$, $\Delta Z$, $\Delta Ax$, $\Delta Ay$, $\Delta Az$) is calculated, at the time of capturing, excluding the amount of movement from the fitting position to the insertion start position. Thus, the amount of movement from the fitting position to the insertion start position has to be separately stored for use in Step S107 in FIG. 4. Also note that the above-mentioned coordinates are obtained with respect to the coordinate system of the monocular camera. Thus, when the coordinate system of the monocular camera does not match the coordinate system of the entire robot arm 100, the control unit 203 needs to perform coordinate conversion before controlling the robot arm 100.

In this embodiment, because the monocular camera is fixed to the robot arm 100, the coordinate system of the female connector 120 and the coordinate system of the monocular camera 102 are different. If the monocular camera 102 and the female connector 120 are in the same coordinate system, the conversion from the coordinate system for the monocular camera 102 to the coordinate system for the robot arm 100 is not necessary.

Next, the detail of the operation and an operation example shown in FIG. 4 will be described.

In Step S101, the robot arm 100 grips a male connector 110 in a preregistered manner, and in Step S102, the male connector 110 is moved to a point almost above the female connector 120.

Note here that the position of the gripped male connector 110 just before being gripped is not always the same. Due to subtle operation deviation of the machine that sets the position of the male connector 110, there is always a possibility that a subtle position errors may have occurred. In the same token, the female connector 120 may also have some errors.

Therefore, it is important that the images acquired in Step S103 show both the male connector 110 and the female connector 120, the images being captured as in FIG. 5 by the imaging unit 201 of the monocular camera 102 attached to the robot arm 100. The position of the monocular camera 102 with respect to the robot arm 100 is always fixed, so that the images include the information on the positional relation between the male connector 110 and the female connector 120.

In Step S104, the control amount ($\Delta X$, $\Delta Y$, $\Delta Z$, $\Delta Ax$, $\Delta Ay$, $\Delta Az$) is calculated by the control parameter generation unit 202 having the neural network as shown in FIG. 6 which has learned in advance the information on the positional relation. However, depending on the accuracy of the learning, the movement to the insertion start position is impossible using the control amount outputted by the control parameter generation unit 202. In such a case, by repeating the loop from Step S103 through S106, the control parameter generation unit 202 may perform calculations until all components of the control amount become equal to or less than their respective threshold values as shown in Step S105, and the control unit 203 and the drive unit 204 further control the position of the robot arm 100.

The threshold values shown in S105 are determined on the basis of the required accuracy of the male connector 110 and the female connector 120 to be fitted. For example, in the case where the fitting is lose, that is, originally the high accuracy as the characteristic of the connector is not required, the threshold values can be set large. In the opposite case, the small threshold values are set. In a general manufacturing process, manufacturing tolerances, which are specified in many cases, may be used for the threshold values.

Also, taking into account the case where, depending on the accuracy of the learning, the movement to the insertion start position is impossible using the control amount outputted by the control parameter generation unit 202, a plurality of insertion start positions may be set. If an insertion start position is set without an enough distance between the male connector 110 and the female connector 120, they may collide with each other and break either or both of them before insertion. To avoid such a risk, the insertion start position may be set stepwise in accordance with the number of times of looping from Step S103 through Step S106 shown in FIG. 4. For example, the distance between the male connector 110 and the female connector 120 may be set to 5 mm for the first time, to 20 mm for the second time, to 10 mm for the third time, and so on.

Although the present embodiment is described using connectors, application of the technique is not limited to fitting of connectors. This method can be effectively applied, for example, to mounting IC chips on a substrate and, especially, to inserting capacitors or the like having legs with a large dimensional error into holes of a substrate.

This method can be applied not only to control for insertion into substrates but also to general position control to derive a control amount from a known relations between images and control amounts. In the present disclosure, the relations between images and control amounts are learned by the neural network; thus, individual differences in the objects can be allowed in performing alignment of the objects.

In Embodiment 1, an imaging unit 201, a control parameter generation unit 202, a control unit 203, and a drive unit 204 are provided. The imaging unit 201 captures an image including two objects. The control parameter generation unit 202 feeds information of the captured image including the two objects into an input layer of a neural network, and outputs a position control amount for controlling the positional relation between the captured two objects as an output layer of the neural network. The control unit 203 controls current or voltage to control the positional relation between the two objects by using the outputted position control amount. The drive unit 204 changes a position of one of the two objects by using the current or the voltage. Therefore, even if there are differences between objects or errors in the positional relationship between the two objects, alignment can be performed only with a monocular camera.

An embodiment using only a single neural network is described above. In some cases, however, a plurality of neural networks have to be used. Because when the inputs are images and the outputs are numerical values as in the embodiment, the outputs may include errors of about several percentage; this is because approximation accuracy in the numerical values is limited. Depending on the amount from the insertion start position to its vicinity in Step S102 of FIG. 4, the determination result may always fall into "No" and, as a result, the operation in Step S105 cannot be completed. To handle such a case, a plurality of networks are used as shown in FIG. 7.

Figure 7:
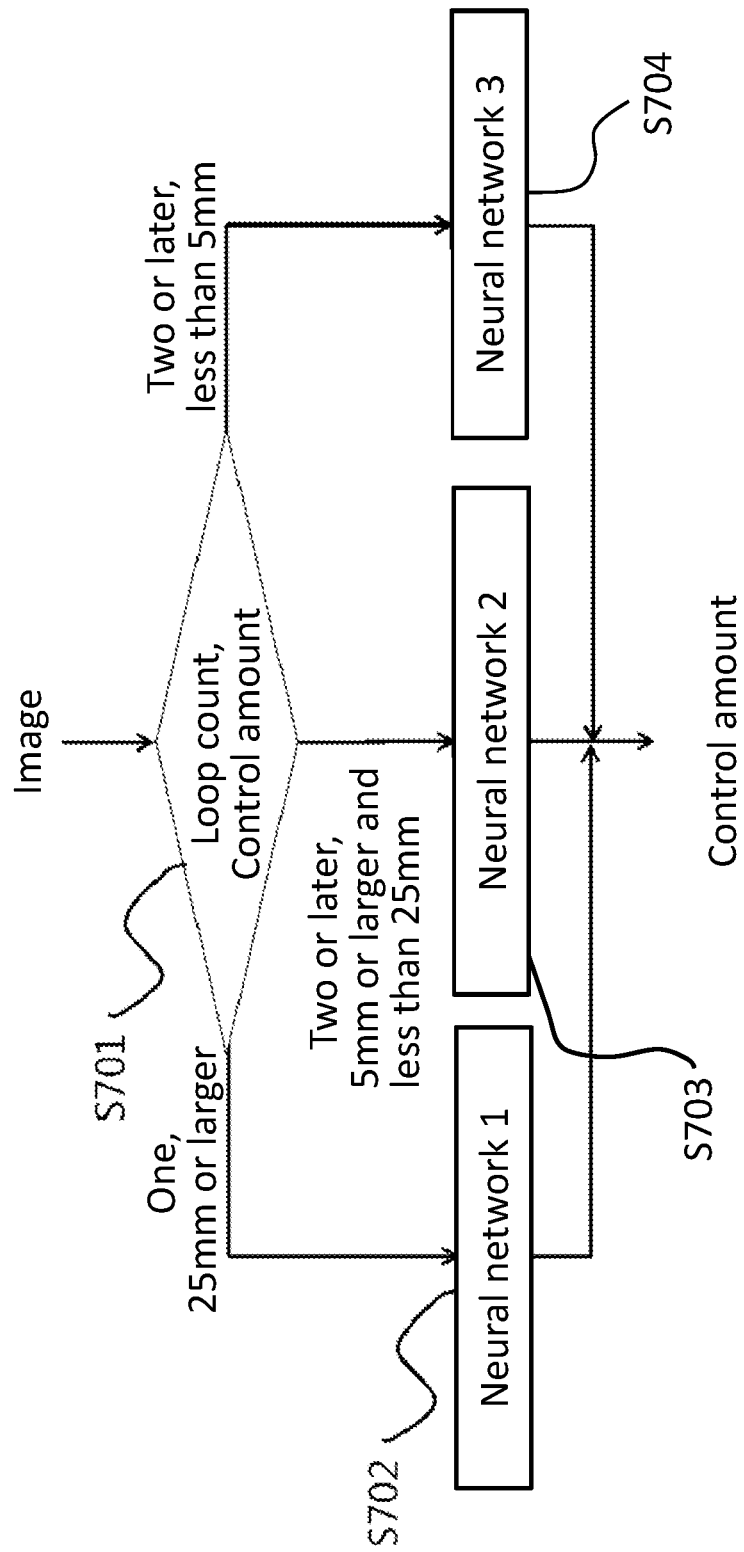
FIG. 7 is a flowchart showing the neural network according to Embodiment 1 in which a plurality of networks are used.

FIG. 7 is a flowchart to use a plurality of neural networks in contrast with the use of the single neural network shown above in Embodiment 1. This shows the detail of Step S104 of FIG. 4. The plurality of parameters are included in the control parameter generation unit shown in FIG. 2.

In Step S701, the control parameter generation unit 202 selects the network to be used on the basis of the inputted image.

When the loop count is one or the previously obtained control amount is equal to or larger than 25 mm, the neural network 1 is selected and the process proceeds to Step S702. When the loop count is two or later and the previously obtained control amount is equal to or larger than 5 mm and smaller than 25 mm, the neural network 2 is selected and the process proceeds to Step S703. When the loop count is two or later and the previously obtained control amount is smaller than 5 mm, the neural network 3 is selected and the process proceeds to Step S704. The neural network for a Step selected from S702 to S704 is used to calculate the control amount.

Each of the neural networks has learned on the basis of the distance between the male connector 110 and the female connector 120 or the control amount. In the figure, for example, the ranges of the learning data are changed in a stepwise fashion; the neural network 3 uses the learning data having errors within ±1 mm and ±1 degree, and the neural network 2 uses the learning data having errors within from ±1 mm to ±10 mm and from ±1 degree to ±5 degrees. It is more efficient not to overlap the ranges of images used in each neural network.

The example shown in FIG. 7 includes three networks, but the number of networks is not limited. When using such a method, a determination function in Step S701, which determines a network to be used, has to be prepared as "a network selection switch". This network selection switch can be configured also by using a neural network. In this case, the input to the input layer is an image, and the output in the output layer is a network number. As an image data set, an image used in all networks and a network number is used.

An example of the use of a plurality of neural networks is described by using connectors. Application of this technique, however, is not limited to fitting of connectors. This method can be effectively applied, for example, to mounting IC chips on a substrate and, especially, to inserting capacitors or the like having legs with a large dimensional error into holes of a substrate.

This method using a plurality of neural networks can be applied not only to control for insertion into substrates but also to general position control to derive a control amount from a known relations between images and control amounts. In the present disclosure, the relations between images and control amounts are learned by the neural network; thus, individual differences in the objects can be allowed in performing alignment of the objects, and the control amounts can be calculated accurately.

In the above example, an imaging unit 201, a control parameter generation unit 202, a control unit 203, and a drive unit 204 are provided. The imaging unit 201 captures an image including two objects. The control parameter generation unit 202 feeds information of the captured image including the two objects into an input layer of a neural network, and outputs a position control amount for controlling the positional relation between the captured two objects as an output layer of the neural network. The control unit 203 controls current or voltage to control the positional relation between the two objects by using the outputted position control amount. The drive unit 204 changes a position of one of the two objects by using the current or the voltage. Here, the control parameter generation unit 202 selects the neural network from a plurality of neural networks. Therefore, even if there are differences between objects or errors in the positional relationship between the two objects, alignment can be performed more accurately.

Embodiment 2

In Embodiment 1, the male connector 110 and the female connector 120, whose positions are known, are fitted together, and the male connector 110 is gripped by the gripping unit 101 of the robot arm 100. Then, the gripping unit 101 moves along the known direction, pulling out the connector, up to the insertion start position, and the monocular camera 102 captures a plurality of images. In Embodiment 2, a case where the fitting position of the male connector 110 and the female connector 120 is unknown will be described.

A method called reinforcement learning has been studied as a method for a robot to autonomously learn to acquire proper actions. In this method, a robot performs a variety of actions by trial and error, stores the action producing a better result, and obtains the optimized action in the end. The optimization of the action, unfortunately, requires a large number of trials.

Among the methods to reduce the number of trials, a framework called "on policy" is generally used in the field of reinforcement learning. However, application of this framework to teaching of a robot arm requires various improvements dedicated for the robot arm and the control signals, and is not yet put to practical use.

In a configuration to be described in Embodiment 2, the robot such as shown in Embodiment 1 performs a variety of actions by trial and error, and the action producing a good result is stored, thereby reduce a large number of trials currently required to optimize the action.

Next, the system configuration will be described. What is not described here is the same as in Embodiment 1. The overall hardware structure is the same as FIG. 1 in Embodiment 1, however, it is different in that the robot arm 100 is provided with a force sensor 801 (not illustrated in FIG. 1) for measuring the load applied to the gripping unit 101.

Figure 8:
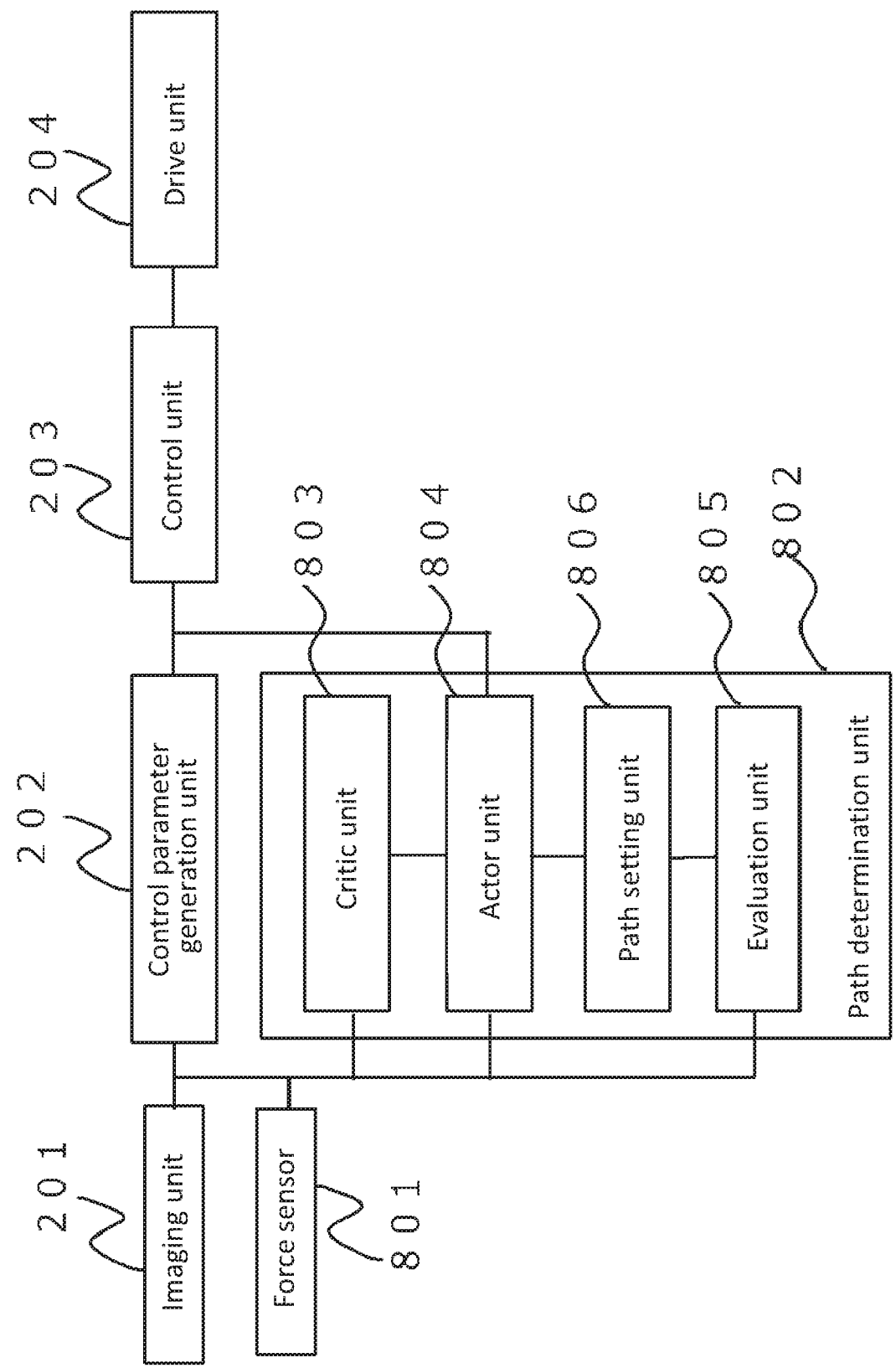
FIG. 8 is a functional configuration diagram of a position control device according to Embodiment 2.

FIG. 8 is a functional configuration diagram showing a position control device according to Embodiment 2. The difference from FIG. 2 is that a force sensor 801 and a path determination unit 802 are added, wherein the path determination unit 802 includes a critic unit 803, an actor unit 804, an evaluation unit 805, and a path setting unit 806.

Figure 9:
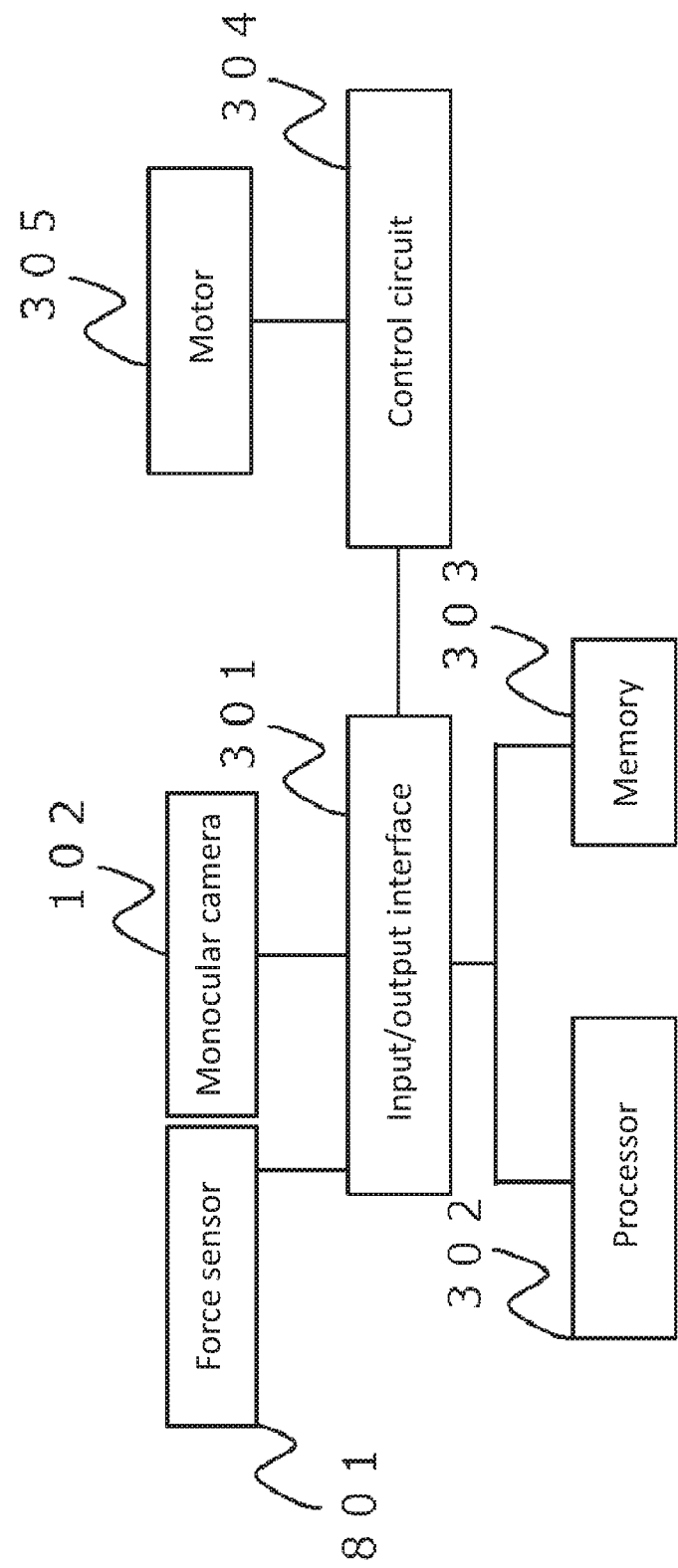
FIG. 9 is a hardware structure diagram of the position control device according to Embodiment 2.

FIG. 9 is a hardware structure diagram showing the position control device according to Embodiment 2. The only difference from FIG. 3 is that the force sensor 801 is connected to an input/output interface 301 electrically or communicably. Also, the input/output interface 301, the processor 302, and the memory 303 perform the functions of the control parameter generation unit 202 and the path determination unit 802 shown in FIG. 8. The force sensor 801, the monocular camera 102 and the input/output interface 301 may be separate bodies, and the input/output interface 301 and the control circuit 304 may be separate bodies.

Next, the detail of FIG. 8 will be described.

The force sensor 801 measures the load applied to the gripping unit 101 of the robot arm 100; for example, it measures the force value applied when the male connector 110 and the female connector 120 shown in FIG. 1 come in contact.

The critic unit 803 and the actor unit 804 are the same as Critic and Actor in the conventional reinforcement learning.

Next, the conventional type of reinforcement learning method will be described. In the present embodiment, a model called Actor-Critic model in the reinforcement learning is used (Reference: Reinforcement Learning: R. S. Sutton and A. G. Barto, published in Dec. 2000). The actor unit 804 and the critic unit 803 obtain a state of an environment via the imaging unit 201 and the force sensor 801. The actor unit 804 is a function to receive the environment state I obtained by the sensor device, and to output the control amount A to the robot controller. The critic unit 803 is configured to cause the actor unit 804 to appropriately learn an output A for the input I so that the fitting of the actor unit 804 will properly succeed.

Next, the conventional type of reinforcement learning method will be described.

In the reinforcement learning, an amount called reward R is defined, and the actor unit 804 acquires the action A that maximizes the reward R. Assuming as an example that the work to be learned is fitting of a male connector 110 and a female connector 120 as shown in Embodiment 1, R=1 is given when fitting is successful and otherwise R=0. In this example, the action A indicates a "movement correction amount" from the current position (X, Y, Z, Ax, Ay, Az), wherein A=(dX, dY, dZ, dAx, dAy, dAz). Here, X, Y, and Z are position coordinates with the central point of the robot as the origin; Ax, Ay, and Az are rotation amounts about X axis, Y axis, and Z axis, respectively. The "movement correction amount" is the amount of movement from the current position to the insertion start position in a first fitting trial of the male connector 110. The environment state or the trial result is observed by the imaging unit 201 and the force sensor 801 and obtained therefrom as an image and a value.

In the reinforcement learning, the critic unit 803 learns a function called state value function V(I). Suppose here that when time t=1 (for example, when the first fitting trial is started), the action A(1) is performed at the state I(1), and when time t=2 (for example, after the finish of the first fitting trial and before the start of the second fitting trial), the environment changes to I(2) and the reward amount R(2) (the result of the first fitting trial) is given. An example, among a variety of updating formulas possible, will be shown next. The updating formula of V(I) is defined as follows.

$$\delta = R(2) + \gamma V(I(2)) - V(I(1)) \quad \text{[Formula 1]}$$

$$V(I(1)) \Leftarrow V(I(1)) + \alpha\delta \quad \text{[Formula 2]}$$

Here, δ is a prediction error, a is a learning rate being a positive real number from 0 to 1, and γ is a discount factor being a positive real number from 0 to 1. The actor unit 804 updates A (I) as follows, with input as I and output as A (I).

When δ>0, $$A(I(1)) \; A(I(1)) + \alpha(A(1) - A(I(1))) \quad \text{[Formula 3]}$$

When δ≤0, $$\sigma(I(1)) = \beta\sigma(I(1)) \quad \text{[Formula 4]}$$

Here, σ denotes the standard deviation of the outputs. In the state I, the actor unit adds to A(I) random numbers having a distribution with the mean 0 and the dispersion σ². This means that the movement correction amount for the second trial is determined at random irrespective of the result of the first trial.

Note here that, from among a variety of the updating formulas in the Actor-Critic model, any type of generally used models can replace the updating formula shown above as an example.

With such a configuration, the actor unit 804 learns the action suitable for each state. However, the action as shown in Embodiment 1 is performed after the learning is completed. During learning, the path setting unit 806 calculates the recommended action for learning, and sends it to the control unit 203. In other words, during learning, the control unit 203 receives the movement signal as it is from the path setting unit 806, and controls the drive unit 204.

This means that, in the conventional Actor-Critic model, the learning is done only when the fitting is successful, owing to the definition that R=1 for the success of the fitting and R=0 otherwise, and the movement correction amounts to be used for the following trials are given at random until the success of the fitting. As a result, until the success of the fitting, the determination of the movement correction amount for the next trial in accordance with degree of failure of the trial is not performed. Even if using other types of reinforcement learning models such as Q-Learning, the similar results will be obtained as when using the conventional type of the Actor-Critic models, because only success or failure of the fitting is evaluated. In the present embodiment of the disclosure, the determination process will be described in which the degree of failure is evaluated to calculate the movement correction amount for the next trial.

Figure 10:
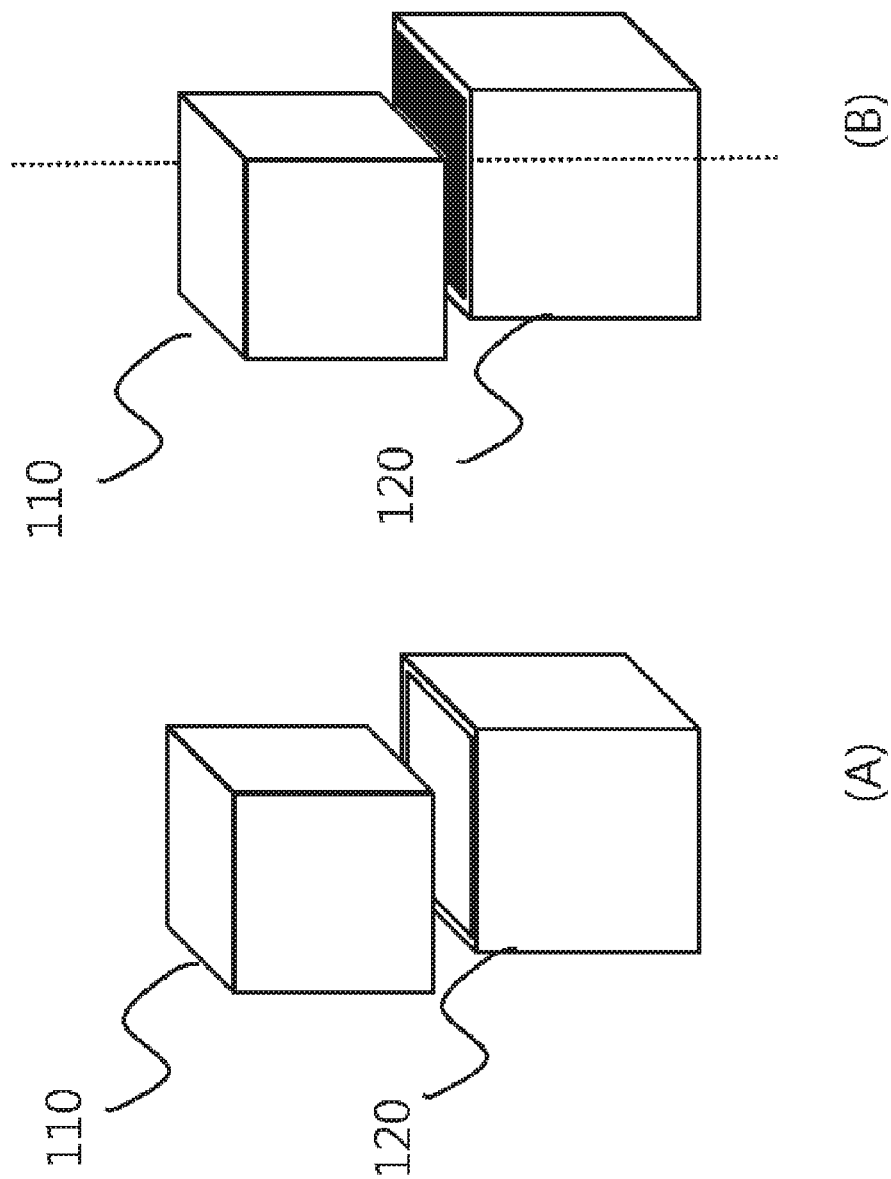
FIG. 10 shows a male connector 110 and a female connector 120 in a trial of fitting according to Embodiment 2.

The evaluation unit 805 generates a function to perform the evaluation in each fitting trial. FIG. 10 shows the male connector 110 and the female connector 120 in a fitting trial according to Embodiment 2.

Suppose that an image as shown in FIG. 10(A) is obtained as a result of the trial. This trial is failed because the connectors are greatly out of fitting position. Here, how close it is to the success is measured and quantified to obtain an evaluation value indicating the degree of success. An example of quantification method is to calculate the surface area (the number of pixels) of the connector being the insertion destination part in the image as shown in FIG. 10 (B). In this method, when the failure of insertion of the male connector 110 to the female connector 120 is detected by the force sensor 801 of the robot arm 100, if only the fitting surface of the female connector 120 is applied with a coating or a sticker with a color different from other backgrounds, data acquisition from the image and the calculation are easier. In the above described method, one camera was used; however, a plurality of aligned cameras may capture images, and the results derived from each image may be integrated.

Also, a similar evaluation can be performed by obtaining the number of pixels along the two dimensional directions (such as X, Y directions), instead of the surface area of the connector.

The processing in the path setting unit 806 is divided into two steps.

In the first step, the path setting unit 806 learns the evaluation result processed in the evaluation unit 805 and the actual movement of the robot. Let the movement correction amount for the robot be A, and let the evaluation value indicating the degree of success processed by the evaluation unit 805 be E. Then, the path setting unit 806 prepares a function with A as the input and E as the output to perform the approximation. The function, for example, includes a Radial Basis Function (RBF) network. RBF is known as a function that can easily approximate various unknown functions.

For example, suppose the k-th input as follows.

$$x\hat{\ }k = x\_1\hat{\ }k, \ldots, x\_i\hat{\ }k, \ldots x\_1\hat{\ }k) \quad \text{[Formula 5]}$$

Then, the output f(x) is defined as follows.

$$f(x) = \Sigma_j^i w_j \varphi_j(x) \quad \text{[Formula 6]}$$

$$\varphi_j(x) = \exp(-\Sigma(x_i - \mu_i)^2/\sigma^2) \quad \text{[Formula 7]}$$

Here, σ denotes the standard deviation; μ denotes the center of RBF.

The learning data used by the RBF is not a single data but all data from the start of the trial to the latest. For example, if the current trial is the N-th trial, N data sets are prepared. Through the learning, the above-mentioned W=(w_1, w_J) has to be determined. Among various determination methods, RBF interpolation is exemplified as follows.

Suppose Formula 8 and Formula 9 are given as follow.

$$\Phi = \begin{pmatrix} \varphi_1(x_1^1) & \cdots & \varphi_l(x_l^1) \\ \vdots & \ddots & \vdots \\ \varphi_1(x_1^N) & \cdots & \varphi_l(x_l^N) \end{pmatrix} \quad \text{[Formula 8]}$$

$$F = (f(x^1), \ldots, f(x^N)) \quad \text{[Formula 9]}$$

Then, the learning is completed by Formula 10.

$$W = \Phi^{-1} F \quad \text{[Formula 10]}$$

After the approximation is completed through the RBF interpolation, the minimum value is calculated by the RBF network using a general optimization method such as gradient descent and Particle Swam Optimization (PSO). Then, the minimum value is transmitted to the actor unit 804 as a recommended value for the next trial.

To explain the above case specifically, the surface areas or the numbers of pixels in the two-dimensional direction for the respective movement correction amounts are arranged in time series for each trial number as evaluation values, and the arranged values are used to obtain the optimal solution. More simply, the movement correction amount may be obtained which causes movement at a constant rate in the direction where the number of pixels in the two-dimensional direction decreases.

Figure 11:
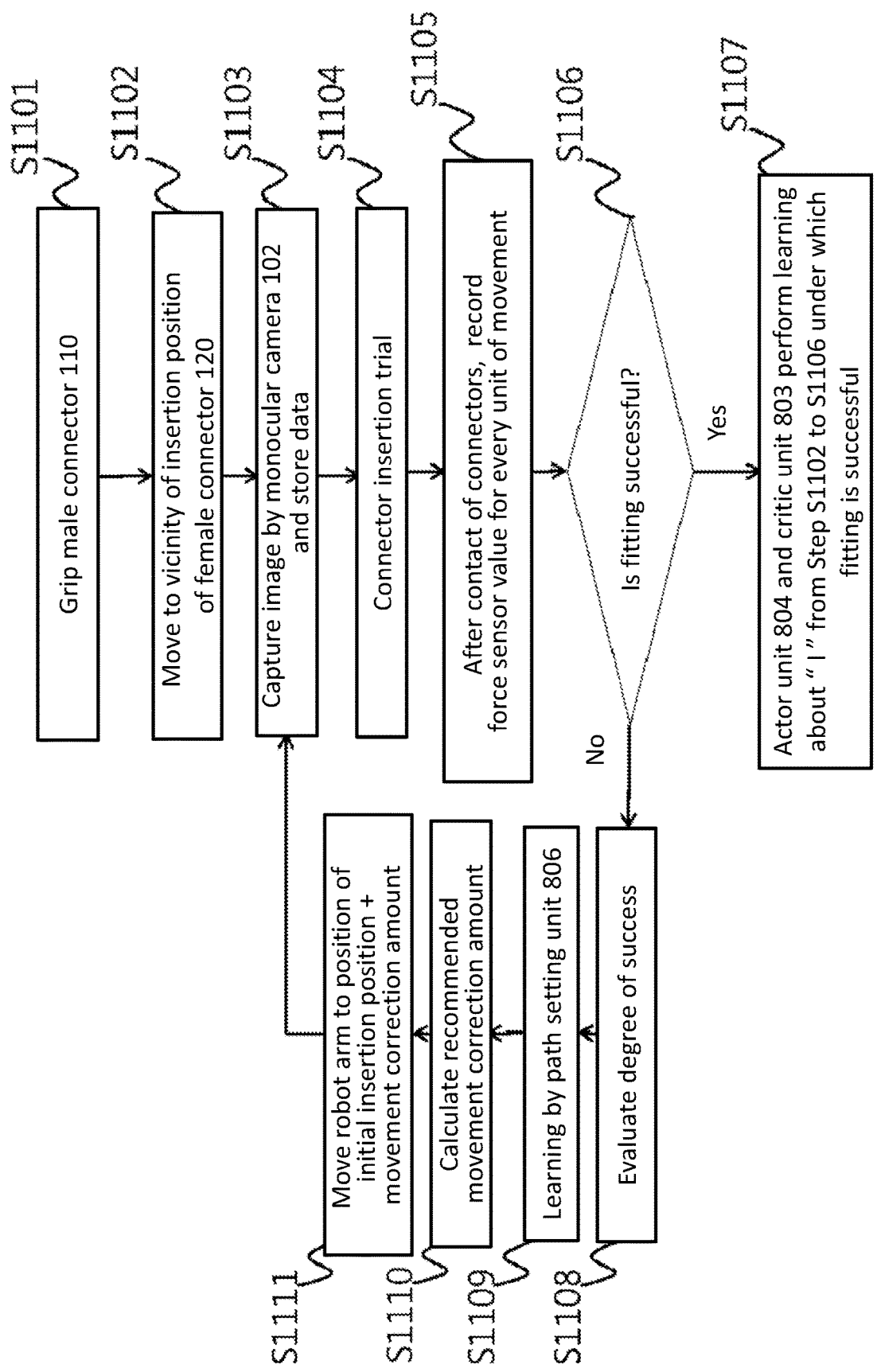
FIG. 11 is a flowchart showing of the path learning of the position control device according to Embodiment 2.

Next, the operational flow is shown in FIG. 11.

FIG. 11 is a flowchart showing the path learning of the position control device according to Embodiment 2.

First, in Step S1101, the gripping unit 101 of the robot arm 100 grips the male connector 110. The position and the attitude of the male connector 110 are preregistered in the control unit 203 in FIG. 8 and the operation is performed in accordance with the control program preregistered in the control unit 203.

Next, in Step S1102, the robot arm 100 is brought closer to the vicinity of the insertion position of the female connector 120. The approximate position and attitude of the female connector 120 are preregistered in the control unit 203 in FIG. 8, and the position of the male connector 110 is controlled in accordance with the control program preregistered in the control unit 203. The steps up to here are the same as Steps S101 to S102 in the flowchart shown in FIG. 4 in Embodiment 1.

In Step S1103, the path determination unit 802 instructs the imaging unit 201 of the monocular camera 102 to capture an image. The monocular camera 102 captures an image which includes both the male connector 110 gripped by the gripping unit 101 and the female connector 120 being the insertion destination part. Also, the path determination unit 802 instructs the control unit 203 and the monocular camera 102 to capture images in the vicinity of the current position. The monocular camera is moved by the drive unit 204 to a plurality of positions based on amounts of movement instructed by the control unit 203, and captures at each position an image which includes both the male connector 110 and the female connector 120 being the insertion destination part.

In Step S1104, the actor unit 804 of the path determination unit 802 provides an amount of movement for fitting to the control unit 203; the control unit 203 causes the drive unit 204 to moves the robot arm 100 to make a fitting trial of the male connector 110 and the female connector 120 being the insertion destination part.

In Step S1105, when the connectors get in contact with each other while the robot arm 100 is being moved by the drive unit 204, the evaluation unit 805 and the critic unit 803 of the path determination unit 802 store the values obtained from the force sensor 801 and the images obtained from the monocular camera 102 for every unit amount of the movement.

In Step S1106, the evaluation unit 805 and the critic unit 803 check whether the fitting is succeeded.

In most cases, the fitting is not successful at this point. Thus, in Step S1108, the evaluation unit 805 evaluates the degree of success using the method described in FIG. 10, and provides the evaluation value indicating the degree of success in the alignment to the path setting unit 806.

In Step S1109, the path setting unit 806 performs the learning using the above-mentioned method and provides a recommended value for the next trial to the actor unit 804. The critic unit 803 calculates a value in accordance with the reward amount and outputs the value. The actor unit 804 receives the value. In Step S1110, the actor unit 804 adds the value obtained in accordance with the reward amount and outputted by the critic unit 803 and the recommended value for the next trial outputted by the path setting unit 806 in order to obtain the movement correction amount. In this step, however, if only the recommended value for the next trial outputted from the path setting unit 806 can produce a sufficient effect, the value obtained in accordance with the reward amount is not need to be added. Also, in calculating the movement correction amount, the actor unit 804 may set an addition ratio of the recommended value for the next trial outputted from the path setting unit 806 to the value obtained in accordance with the reward amount outputted by the critic unit 803, thereby the movement correction amount may be changed in accordance with the reward amount.

Then, in Step S1111, the actor unit 804 provides the movement correction amount to the control unit 203, and the control unit 203 moves the gripping unit 101 of the robot arm 100.

Then, the process returns to Step S1103, the images are captured at the position to which the robot arm 100 is moved in accordance with the movement correction amount, and then the fitting operation is performed. These steps are repeated until the fitting succeeds.

When the fitting is successful, the actor unit 804 and the critic unit 803 learn, in Step S1107, about the environmental state I from Steps S1102 to S1106 under which the fitting is successful. Lastly, the path determination unit 802 provides the learned data of the neural network to the control parameter generation unit 202, so that the operation according to Embodiment 1 can be performed.

Note here that, in Step S1107, the actor unit 804 and the critic unit 803 learn about the environmental state I under which the fitting is successful; however, the actor unit 804 and the critic unit 803 may learn using the data obtained for all fitting trials from the start to the success of the fitting. In Embodiment 1, the case is described where a plurality of neural networks are formed in accordance with the control amount. In this regard, if the position that results in successful fitting is known, it is possible to form at the same time a plurality of suitable neural networks according to the magnitude of the control amount.

This description is provided on the basis of the Actor-Critic model as a module of the reinforcement learning, but another reinforcement learning model such as Q-Learning can also be used.

The RBF network is exemplified as the approximation function, but another approximation function method (linear function, quadratic function, etc.) may be used.

The above example of evaluation method used a connector having a surface with different color from other surfaces; however, the deviation amount between connectors, or the like, obtained by using another image processing technique may be used for the evaluation.

As stated in Embodiment 1 and in the present embodiment, application of this technique is not limited to fitting of connectors. This method can be effectively applied, for example, to mounting IC chips on a substrate and, especially, to inserting capacitors or the like having legs with a large dimensional error into holes of a substrate.

This method can be applied not only to control for insertion into substrates but also to general position control to derive a control amount from a known relations between images and control amounts. In the present disclosure, the relations between images and control amounts are learned by the neural network; thus, individual differences in the objects can be allowed in performing alignment of the objects, and the control amounts can be calculated accurately.

According to the present embodiment, in application of the Actor-Critic model to the learning of the control amounts, the actor unit 804 calculates the movement correction amounts for the trials by adding the value obtained by the critic unit 803 in accordance with the reward amount and the recommended value obtained by the path setting unit 806 on the basis of the evaluation value. Thus, the present disclosure can significantly reduce the number of trials for the alignment, whereas the conventional Actor-Critic models require a large number of trials and errors until the successful alignment.

Note that in the present embodiment, it is described that the number of trials of the alignment can be reduced by evaluating the images of misalignment obtained from the imaging unit 201; however, the number of trials also can be reduced by using the values obtained from the force sensor 801 during the alignment trials. For example, in the fitting of connectors or in the alignment of two objects including insertion, the detection of a failure is generally performed in a way that, when the value obtained from the force sensor 801 exceeds a threshold, the actor unit 804 checks whether the two objects are in a position where fitting or insertion is complete. In such a case, the following cases may be considered. One of such cases is a case where the fitting or insertion is not completed (Case A), and another is a case where the fitting or insertion is completed, but during the fitting or insertion, the value obtained from the force sensor 801 has reached a certain value (Case B).

Case A can be handled by a method of learning with both the value from the force sensor 801 and the image. The detail will be described in Embodiment 3.

Case B can be handled by a method of learning with only the value from the force sensor 801 described in Embodiment 3. The similar effect can be obtained by using another method in which the reward R of Actor-Critic model is defined that $R=(1 \cdot A/F)$ at the time of success, $R=0$ at the time of failure. Here, F is the maximum load applied during the fitting or insertion, and A is a positive constant.

Embodiment 3

In the present embodiment, a method of efficiently collecting data in the learning process performed after successful alignment in Embodiment 2 will be described. What is not specifically mentioned here is assumed to be the same as in Embodiment 2. Therefore, regarding the position control device according to Embodiment 3, the functional configuration diagram is shown in FIG. 8, and the hardware structure diagram is shown in FIG. 9.

Regarding the action, a method of collecting learning data more efficiently in the operation of Step S1107 of FIG. 11 in Embodiment 2 will be described below.

Figure 12:
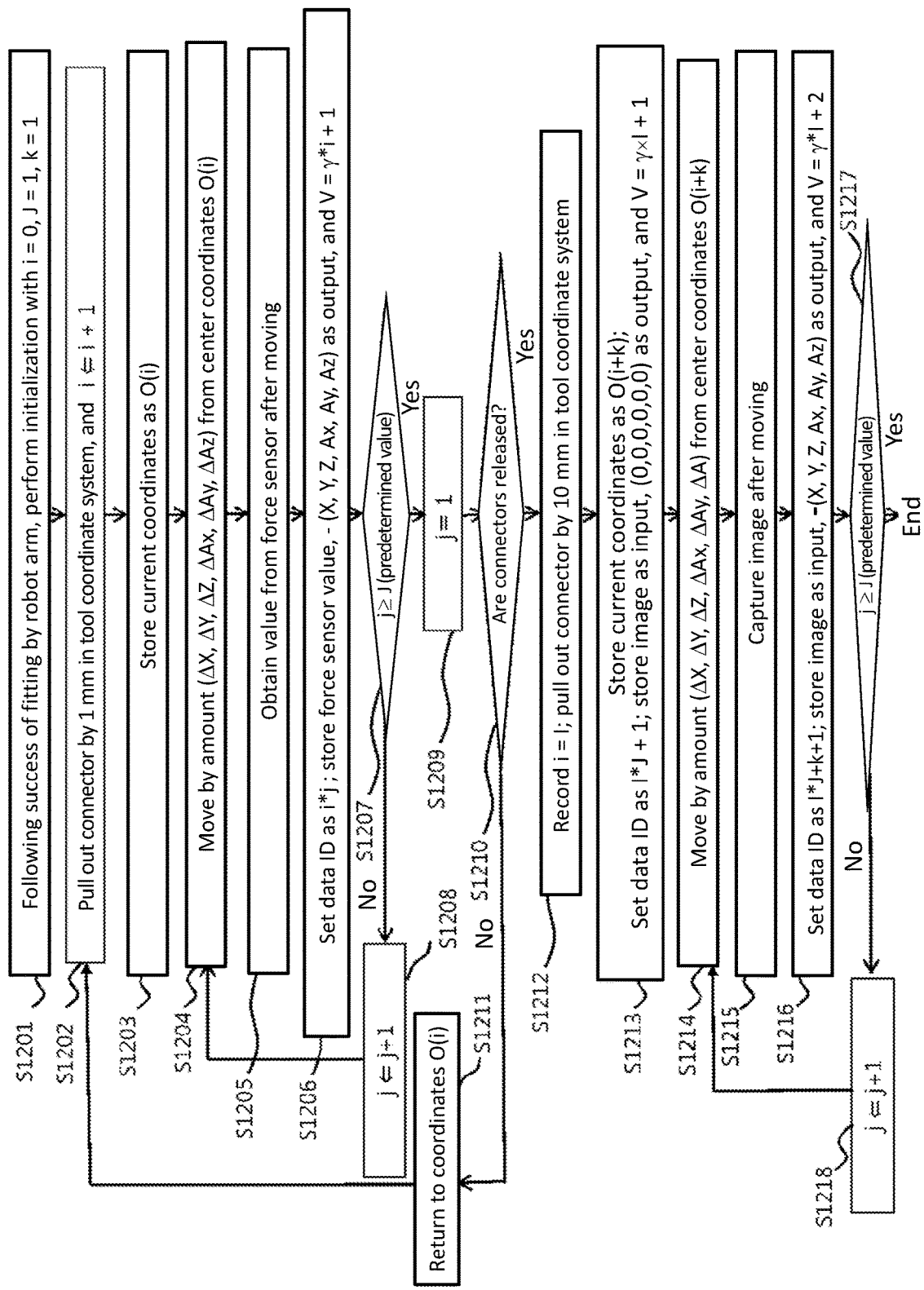
FIG. 12 is a flowchart showing of the path learning of a position control device according to Embodiment 3.

FIG. 12 is a flowchart showing a path learning process of the position control device according to Embodiment 3.

First, in Step S1201, when the fitting of the male connector 110 and the female connector 120 succeeds in Step S1107 of FIG. 11, the path setting unit 806 initializes the variables as i=0, j=1, and k=1. Here, the variable i indicates the number of learnings for the robot arm 100 hereafter, the variable k indicates the number of learnings after the fitting of the male connector 110 and the female connector 120 is released; and the variable j indicates the loop count in the flowchart shown in FIG. 12.

Next, in Step S1202, the path setting unit 806 provides an amount of movement to the control unit 203 via the actor unit 804 for returning by 1 mm from a state caused by the amount of movement for fitting provided in Step S1104 in FIG. 11, and causes the drive unit 204 to move back the robot arm 100 accordingly. Then, the variable i is incremented by one. Here, the amount of movement for returning by 1 mm is provided, but the unit amount is not limited to 1 mm, and may be 0.5 mm, 2 mm and the like.

In Step S1203, the path setting unit 806 stores the current coordinates as O(i) (i=1 at this time).

In Step S1204, the path setting unit 806 generates random amount of movement ($\Delta X$, $\Delta Y$, $\Delta Z$, $\Delta Ax$, $\Delta Ay$, $\Delta Az$) from point O(i), and provides the generated random amount of movement to the control unit 203 via the actor unit 804. Then, the drive unit 204 accordingly moves the robot arm 100. Here, the maximum amount of movement can be set to any amount within the range in which the robot arm 100 can move.

In Step S1205, at the position reached in Step S1204, the actor unit 804 collects the value obtained by the force sensor 801 corresponding to the random amount of movement ($\Delta X$, $\Delta Y$, $\Delta Z$, $\Delta Ax$, $\Delta Ay$, $\Delta Az$). In Step S1206, the critic unit 803 and the actor unit 804 record, as a data set for learning, the value ($-\Delta X$, $-\Delta Y$, $-\Delta Z$, $-\Delta Ax$, $-\Delta Ay$, $-\Delta Az$) being the amount of movement multiplied by $-1$, and the sensor value of the force sensor 801 measuring the force to hold the male connector 110.

In Step S1207, the path setting unit 806 judges whether the number of collected data sets has reached the predetermined number J. If the number of data sets falls short, in Step S1208, the variable j is incremented by one, and in Step S1204 again, the amount of movement ($\Delta X$, $\Delta Y$, $\Delta Z$, $\Delta Ax$, $\Delta Ay$, $\Delta Az$) is updated by using some random number to obtain another data set. Thus, the Steps S1204 to S1207 are repeated until the number of data sets reaches the predetermined number J.

When the number of data sets reaches the predetermined number, the path setting unit 806 sets the variable j to one in Step S1209, and checks whether the fitting of the male connector 110 and the female connector 120 is released in Step S1210.

If not released, the process returns to Step S1202 via Step S1211.

In Step S1211, the path setting unit 806 provides the amount of movement to the control unit 203 via the actor unit 804 so that the coordinates of the robot arm 100 will return to O(i) that are coordinates before the random amounts of movement were provided. Then, the drive unit 204 accordingly moves the robot arm 100.

Then, the loop from Step S1202 to Step S1210 is repeated; that is, the following two processes are repeated until the fitting of the male connector 110 and the female connector 120 is released: the process of returning by 1 mm or a unit amount from a state caused by the amount of movement provided for fitting, and returning the robot arm 100 accordingly; and a process of providing the random amounts of movement from the returned position, and collecting data of the force sensor 801 there. When the fitting of the male connector 110 and the female connector 120 is released, the process proceeds to Step S1212.

In Step S1212, the path setting unit 806 sets the value of variable i as I, where I is an integer larger than the value of variable i at the time when it is determined that the fitting of the male connector 110 and the female connector 120 is released. The path setting unit 806 then provides with the control unit 203 via the actor unit 804 an amount of movement for returning by 10 mm (not limited to this value) from the state caused by the amount of movement provided for fitting, and causes the drive unit 204 to move back the robot arm 100 accordingly.

In Step S1213, the path setting unit 806 stores the coordinates of the position to which the robot arm 100 has moved in step S1212 as the coordinates of the center position O (i+k).

In Step S1214, the path setting unit 806 generates again a random amount of movement ($\Delta X$, $\Delta Y$, $\Delta Z$, $\Delta Ax$, $\Delta Ay$, $\Delta Az$) from the center position O(i+k), and provides, via the actor unit 804, the generated random amount of movement to the control unit 203. Then, the drive unit 204 accordingly moves the robot arm 100.

In Step S1215, the critic unit 803 and the actor unit 804 obtain the image captured by the imaging unit 201 of the monocular camera 102 at the position of the robot arm 100 that has moved by the random amount of movement ($\Delta X$, $\Delta Y$, $\Delta Z$, $\Delta Ax$, $\Delta Ay$, $\Delta Az$).

In Step S1216, the critic unit 803 and the actor unit 804 record, as a learning data set, the amount ($-\Delta X$, $-\Delta Y$, $-\Delta Z$, $-\Delta Ax$, $-\Delta Ay$, $-\Delta Az$) obtained by multiplying the random amount of movement by $-1$ and the captured image.

In Step S1217, the path setting unit 806 checks whether the number of data sets collected has reached the predetermined number J. If the number of data sets falls short, in Step S1218, the variable j is incremented by one, and the process returns to Step S1214. The path setting unit 806 changes the amount of movement ($\Delta X$, $\Delta Y$, $\Delta Z$, $\Delta Ax$, $\Delta Ay$, $\Delta Az$) at random and obtains another data set for movement. Steps S1214 to S1217 are repeated until the number of data sets reaches the predetermined number J.

Note here that, the maximum random amount of movement ($\Delta X$, $\Delta Y$, $\Delta Z$, $\Delta Ax$, $\Delta Ay$, $\Delta Az$) in S1214 and the maximum random amount of movement in S1204 may be different.

The actor unit 804 and the critic unit 803 perform the learning using the learning data sets obtained by the method described above.

FIG. 13 is a diagram showing an example of the neural network and the learning rule of the neural network according to Embodiment 3.

In Embodiments 1 and 2, the learning method using the data obtained by the force sensor 801 is not described. In Embodiments 1 and 2, only the images are used for the input layer, but in Embodiment 3, the values obtained by the force sensor 801 may be fed into the input layer in place of the images. The values provided by the force sensor 801 may be three (a force and moments about two directions) or six (forces in three directions and moments about three directions). The control amount (ΔX, ΔY, ΔZ, ΔAx, ΔAy, ΔAz) is outputted in the output layer. Note here that, when the fitting of the male connector 110 and the female connector 120 is released, both the images and the values obtained by the force sensor 801 are fed into the input layer at the same time.

In the learning process of the neural network, the parameters of the intermediate layer are optimize so that the output values of the output layer approximate the control amounts; here, the output values are derived from the input images and the values from the force sensor 801 via the intermediate layer, and the control amounts are stored with their respective images and their respective values from the force sensor 801. Lastly, the path determination unit 802 provides the learned data of the neural network to the control parameter generation unit 202, so that the operation according to Embodiment 1 can be performed.

The present embodiment has been described assuming the following. To perform the learning, the robot arm 100 moves back little by little from the fitting position of the male connector 110 and the female connector 120, and then slightly moves to the peripheral positions, and, depending on the number of pixels of the image of the monocular camera 102, satisfactory learning cannot be performed until the fitting is released. However, if the monocular camera 102 produces sufficiently high definition images, which allow the sufficient learning using the images obtained when the robot arm 100 slightly moves to the peripheral positions, the learning may be performed by using only the images provided by the monocular camera 102. Also, even when the male connector 110 and the female connector 120 are in the fitted state, both the images of the monocular camera 102 and the values obtained from the force sensor 801 may be used.

In Embodiments 1 and 2, the case where a plurality of neural networks are used is described. Also in the present embodiment, for example, different neural networks may be used for the case where the male connector 110 and the female connector 120 are fitted and for the case where they are not fitted. As described above, learning can be performed more accurately by using the values from the force sensor 801 to form the input layer when the male connector 110 and the female connector 120 are fitted and using the images to form the input layer when the fitting is released. Further, even in a case of using only the images for learning, accurate learning can be performed by separating processing for the fitted state and for the released state, because the configuration of the images corresponding to each state is different.

As stated in Embodiments 1 and 2, application of this technique is not limited to fitting of connectors. This method can be effectively applied, for example, to mounting IC chips on a substrate and, especially, to inserting capacitors or the like having legs with a large dimensional error into holes of a substrate.

This method can be applied not only to control for insertion into substrates but also to general position control to derive a control amount from a known relations between images and control amounts. In the present disclosure, the relations between images and control amounts are learned by the neural network; thus, individual differences in the objects can be allowed in performing alignment of the objects, and the control amounts can be calculated accurately.

In the present embodiment, for a case of performing operations including alignment and insertion of two objects, a path setting unit 806 and an actor unit 804 are provided to learn a control amount. The path setting unit 806 provides the amount of movement for removing an object from its inserted position, and for locating it on and around the path of removing. The actor unit 804 obtains positions of the object and the values of a force sensor 801 there to perform learning by letting the positions of the object be the values for the output layer and letting the values of the force sensor 801 be the values for the input layer. Therefore, learning data can be collected efficiently.

DESCRIPTION OF SYMBOLS

100: robot arm
101: gripping unit
102: monocular camera
110: male connector
120: female connector
201: imaging unit
202: control parameter generation unit
203: control unit
204: drive unit
301: input/output interface
302: processor
303: memory
304: control circuit
305: motor
801: force sensor
802: path determination unit
803: critic unit
804: actor unit
805: evaluation unit
806: path setting unit

The invention claimed is:

1. A position control device for operations including alignment and insertion regarding two objects, the device comprising
    processing circuitry
    to instruct, in removing one of the two objects from their inserted state, a first amount of movement for moving from the inserted state to a position on a path where the inserted state is not released, and a second amount of movement for randomly moving from the first amount of movement to a peripheral position where the inserted state is not released
    to obtain position data and a force sensor value after movement to learn the position data after movement as an output layer and the force sensor value at the position after movement as an input layer, and
    to obtain a reward value that decreases in proportion to the force sensor value.

2. The position control device according to claim 1, further comprising:
    controlling circuitry to control current or voltage to control positional relation between the two objects by using the instructed first amount of movement and second amount of movement; and
    a drive unit to change a position of one of the two objects using the current or the voltage, wherein
    the force sensor measures a force applied to maintain the positional relation between the two objects.

3. The position control device according to claim 1, further comprising a monocular camera to capture and obtain an image including the two objects, wherein
    the processing circuitry obtains the image captured by the monocular camera at the position after movement.

4. The position control device according to claim 2, further comprising a monocular camera to capture and obtain an image including the two objects, wherein
the processing circuitry obtains the image captured by the monocular camera at the position after movement.

5. The position control device according to claim 1, wherein the processing circuitry learns by using Actor-Critic model on a basis of the input layer and the output layer.

6. The position control device according to claim 2, wherein the processing circuitry learns by using Actor-Critic model on a basis of the input layer and the output layer.

7. The position control device according to claim 3, wherein the processing circuitry learns by using Actor-Critic model on a basis of the input layer and the output layer.

8. The position control device according to claim 4, wherein the processing circuitry learns by using Actor-Critic model on a basis of the input layer and the output layer.

9. The position control device according to claim 5, wherein
the processing circuitry learns with a plurality of neural networks,
one of the plurality of neural networks uses, for learning, position data when positional relation between the two objects is in the inserted state, and
another one of the plurality of neural networks uses, for learning, position data when the positional relation between the two objects is not in the inserted state.

10. The position control device according to claim 6, wherein
the processing circuitry learns with a plurality of neural networks,
one of the plurality of neural networks uses, for learning, position data when positional relation between the two objects is in the inserted state, and
another one of the plurality of neural networks uses, for learning, position data when the positional relation between the two objects is not in the inserted state.

11. The position control device according to claim 7, wherein
the processing circuitry learns with a plurality of neural networks,
one of the plurality of neural networks uses, for learning, position data when positional relation between the two objects is in the inserted state, and
another one of the plurality of neural networks uses, for learning, position data when the positional relation between the two objects is not in the inserted state.

12. The position control device according to claim 8, wherein
the processing circuitry learns with a plurality of neural networks,
one of the plurality of neural networks uses, for learning, position data when positional relation between the two objects is in the inserted state, and
another one of the plurality of neural networks uses, for learning, position data when the positional relation between the two objects is not in the inserted state.

13. The position control device according to claim 9, wherein
the processing circuitry
uses the force sensor value as position data when the positional relation between the two objects is in the inserted state, and
uses image data as position data when the positional relation between the two objects is not in the inserted state.

14. The position control device according to claim 10, wherein
the processing circuitry
uses the force sensor value as position data when the positional relation between the two objects is in the inserted state, and
uses image data as position data when the positional relation between the two objects is not in the inserted state.

15. The position control device according to claim 11, wherein
the processing circuitry
uses the force sensor value as position data when the positional relation between the two objects is in the inserted state, and
uses image data as position data when the positional relation between the two objects is not in the inserted state.

16. The position control device according to claim 12, wherein
the processing circuitry
uses the force sensor value as position data when the positional relation between the two objects is in the inserted state, and
uses image data as position data when the positional relation between the two objects is not in the inserted state.

17. A position control method including alignment and insertion regarding two objects, the method comprising:
instructing, in removing one of the two objects from their inserted state, a first amount of movement for moving from the inserted state to a position on a path where the inserted state is not released, and a second amount of movement for randomly moving from the first amount of movement to a peripheral position where the inserted state is not released;
obtaining position data and a force sensor value after movement to learn the position data after movement as an output layer and the force sensor value at the position after movement as an input layer; and
obtaining a reward value that decreases in proportion to the force sensor value.

18. A position control method including alignment and insertion regarding two objects, the method comprising:
instructing, in removing one of the two objects from their inserted state, a first amount of movement for moving from the inserted state to a position on a path where the inserted state is not released, and a second amount of movement for randomly moving from the first amount of movement to a peripheral position where the inserted state is not released;
obtaining position data and a force sensor value after movement to learn the position data after movement as an output layer and the force sensor value at the position after movement as an input layer;
obtaining a reward value that decreases in proportion to the force sensor value; and
learning by using Actor-Critic model on a basis of the input layer and the output layer.

* * * * *